March 1, 1960  R. B. HUMPHREYS  2,926,865
ELECTRIC RAZOR CORD TAKE-UP REEL
Filed Sept. 8, 1955  4 Sheets-Sheet 1

INVENTOR.
ROBERT B. HUMPHREYS
BY
ATTY

March 1, 1960 R. B. HUMPHREYS 2,926,865
ELECTRIC RAZOR CORD TAKE-UP REEL
Filed Sept. 8, 1955 4 Sheets-Sheet 2

INVENTOR.
ROBERT B. HUMPHREYS
BY
ATTY

March 1, 1960  R. B. HUMPHREYS  2,926,865
ELECTRIC RAZOR CORD TAKE-UP REEL
Filed Sept. 8, 1955  4 Sheets-Sheet 3
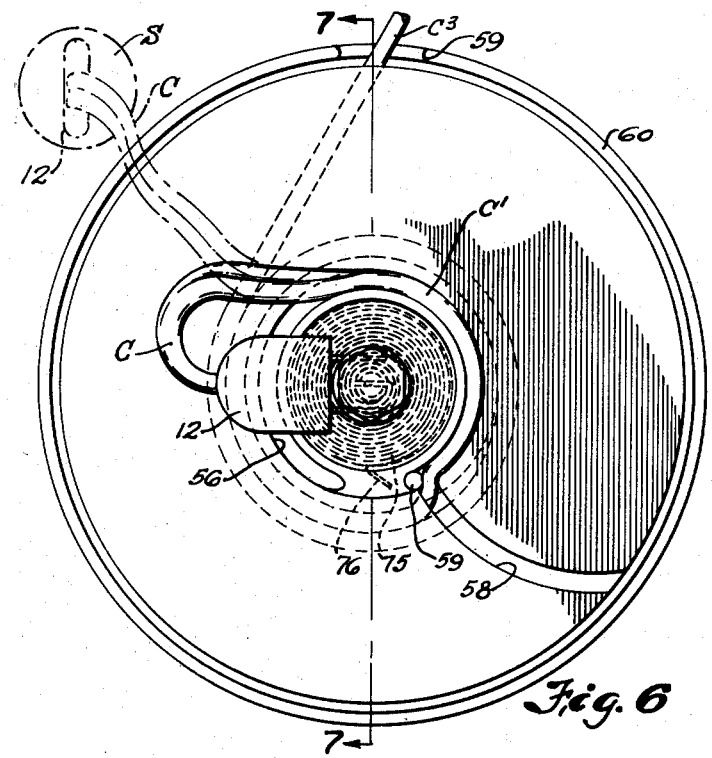
Fig. 6
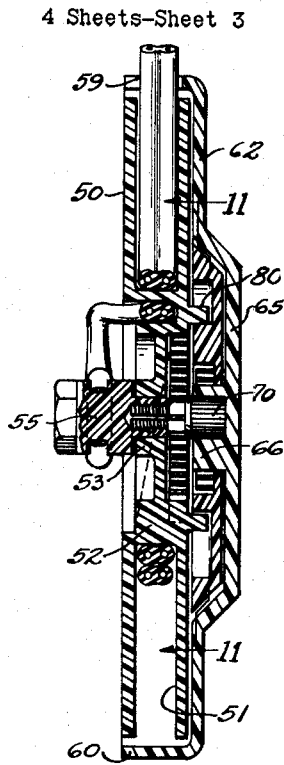
Fig. 7
Fig. 12
Fig. 13
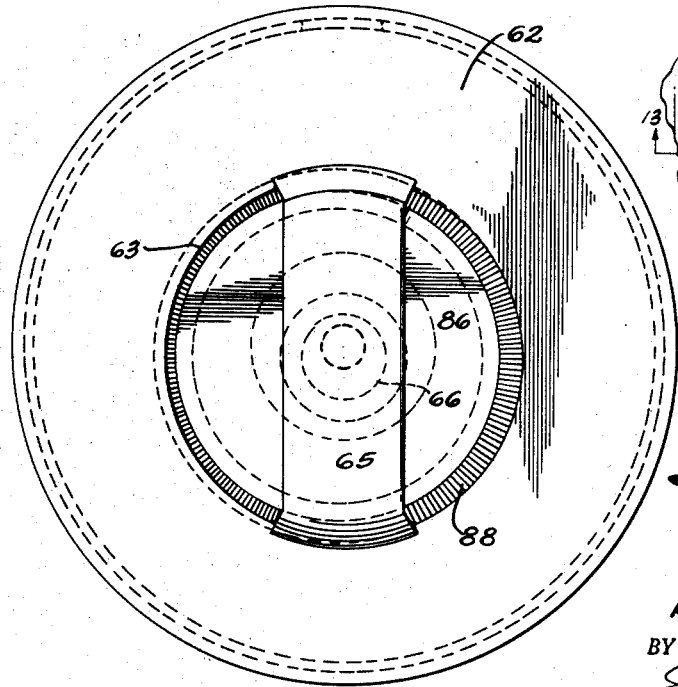
Fig. 8
INVENTOR.
ROBERT B. HUMPHREYS
BY Justin C. Macklin
ATT'Y March 1, 1960 R. B. HUMPHREYS 2,926,865
ELECTRIC RAZOR CORD TAKE-UP REEL
Filed Sept. 8, 1955 4 Sheets-Sheet 4

INVENTOR.
ROBERT B. HUMPHREYS
BY
ATTY

United States Patent Office

2,926,865
Patented Mar. 1, 1960

2,926,865

ELECTRIC RAZOR CORD TAKE-UP REEL

Robert B. Humphreys, Lakewood, Ohio

Application September 8, 1955, Serial No. 533,100

6 Claims. (Cl. 242—107.13)

This invention relates to a take-up reel for insulated electric current-carrying cord of the type having terminal plugs and adapted to be connected with and supply current for operating an electric shaver or analogous motor-driven device.

In the embodiment shown, my new take-up and storage reel is designed particularly for use with electric shavers, and is adapted to wind the cord onto a pulley enclosed within a small compact casing, and in which the cord may be stored and from which it may be withdrawn against spring action, and which is locked against retraction when the cord is in extended position and in use.

Electric razors or shavers are usually provided with a cord several feet long. In the widely used form, the conductor cord comprises two wires insulated from each other but joined in a common unitary, small, flat strip of insulating material, the wires being connected at one end to the terminals for attachment to the motor and having a suitable terminal plug with standard connector tongues at the other end. At present such cords must be wound or folded by hand for enclosure in a suitable container for the razor and cord. Obviously, this requires some skill and patience. Tangling of the cord is not infrequent and it is an objectionable point of "sales resistance" to electric razors and like devices.

A general object of this invention is to provide a simple, compact, easily manipulated cord reel into which substantially the entire length of the cord may be wound by a spring under the control of the reel locking mechanism.

Other objects are to so construct such a reel that its parts may be economically manufactured and easily assembled; that its operation may be convenient and simple; and that it may be attractive in appearance.

More specifically, the present invention lends itself to manufacture by standard molding and fabricating techniques for making the parts, and which, accordingly, may be of material selected for strength, color, and durability.

Still further objects include so constructing such a reel that the standard form and length of cord supplied for use with electric razors or shaving devices, or like motor-driven, hand-operated, translating mechanisms, may be used.

A cord reel constructed according to my invention is light in weight, and in one form, attains another objective, namely, that of easily placing the cord therein for winding at an intermediate point in the cord, and yet the reel is of such a size and light weight as not to interfere with the normal use of the cord while its terminal is "plugged" into a standard outlet socket.

Another form of my invention permits the attachment of the cord and its winding into the reel at a point on the cord adjacent the terminal plug so that any pendulum action of the reel when the cord and electric razor are in use is minimized and, therefore, not objectionable to the user inasmuch as more perfect freedom of use of the razor is permitted.

The accompanying drawings illustrate the preferred embodiments of the two types of reels mentioned above and to which the following description relates.

Figs. 1 to 5 inclusive illustrate one form of my take-up reel in which the cord is simultaneously wound on two side-by-side narrow drums or pulleys, the reel being attached to the cord at its mid portion. Fig. 1 is an elevation of the side of this form of reel, fragments being broken away to show parts in section.

Figure 1:
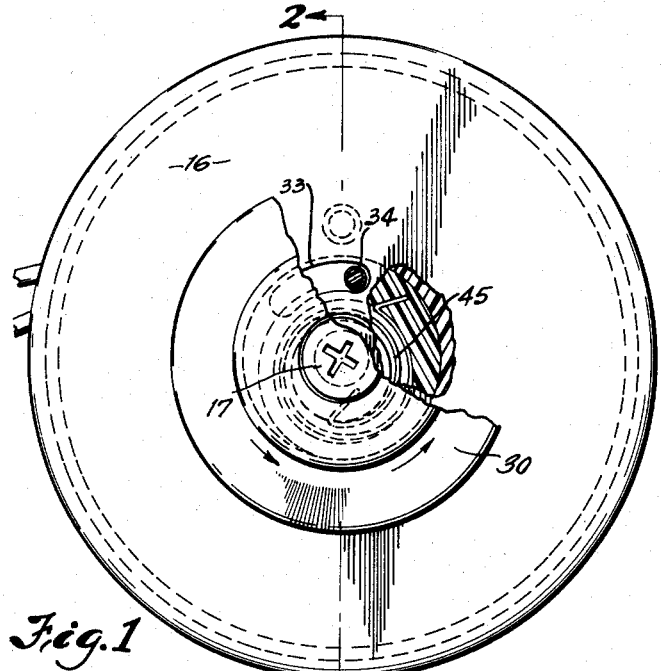
Figure 2:
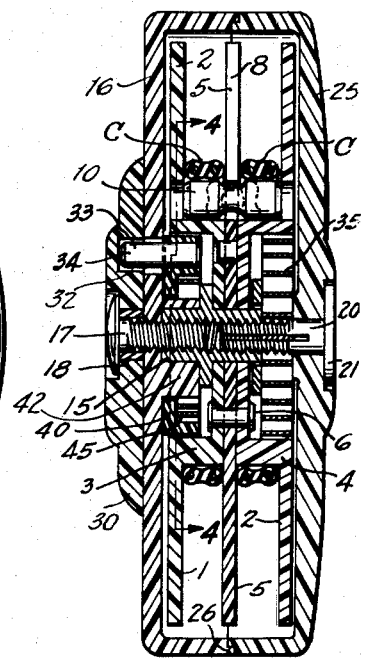
Fig. 2 is an axial section on a plane indicated by the line 2—2 of Fig. 1.
Figure 3:
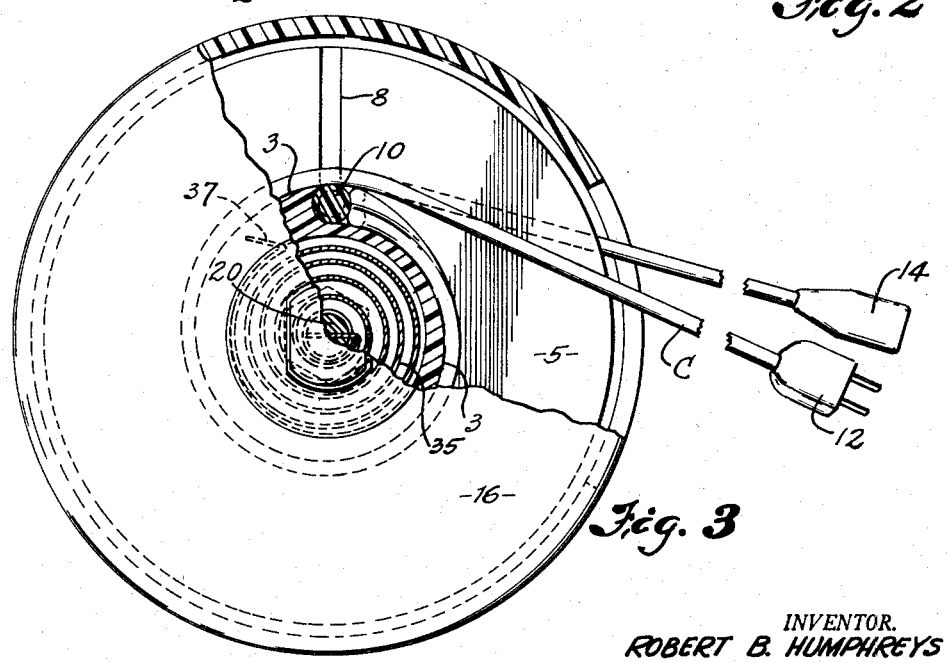
Fig. 3 is an elevational view, again partially in section, showing the attachment of the cord and spring, a portion of one side of the cover being broken away for this purpose.

Figs. 1, 2, and 3 are shown on a scale twice that of the size of the actual reel.

Figure 4:
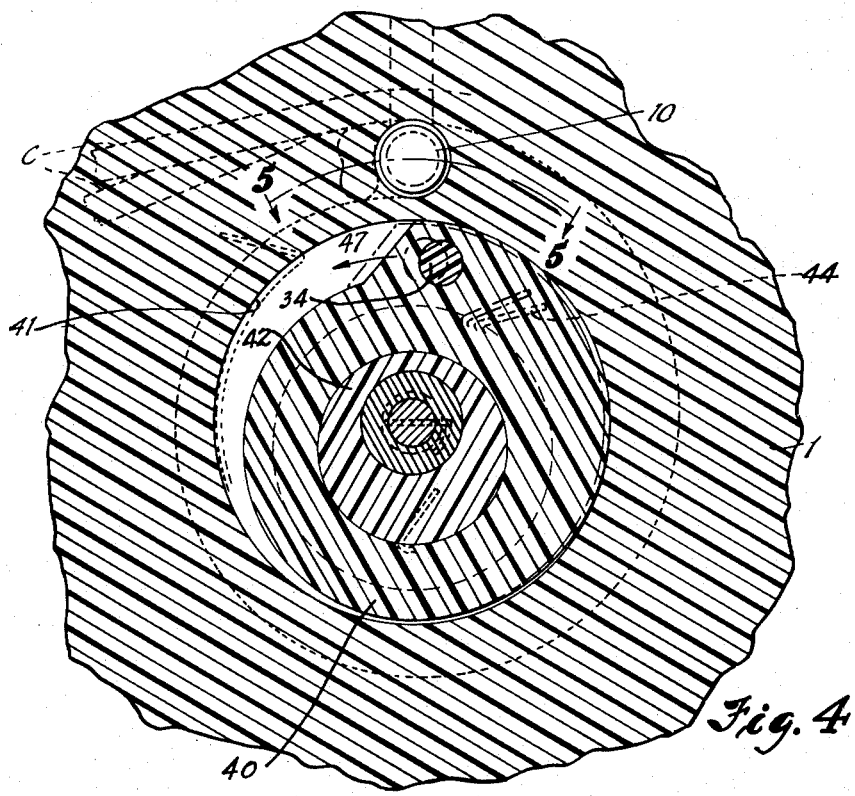

Fig. 4 is a further enlarged sectional view taken on a plane indicated by the line 4—4 of Fig. 2.

Figure 5:
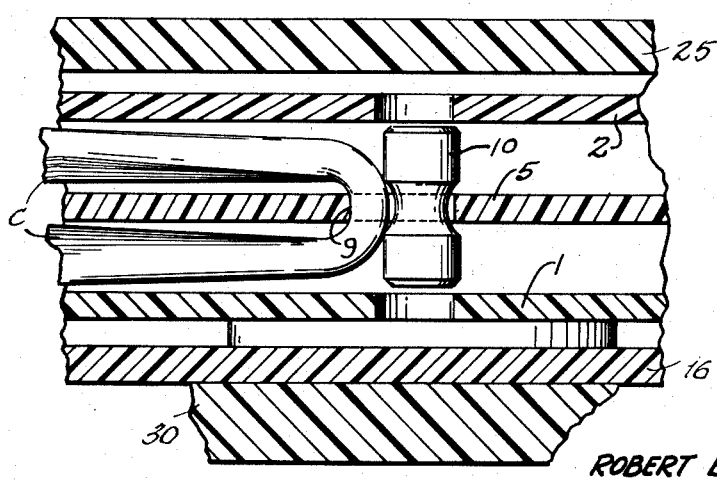

Fig. 5 is a fragmentary transverse section which may be assumed to be taken on a segmental curve indicated by the line 5—5 of Fig. 4.

Fig. 6 is an elevation of one side of the modified form of reel in which the cord is wound in single layers on a single drum or pulley.

Fig. 7 is a transverse section through the reel taken on a plane indicated by the line 7—7 of Fig. 6.

Fig. 8 is an elevation of the side of this form of reel opposite to that of Fig. 6.

Figure 9:
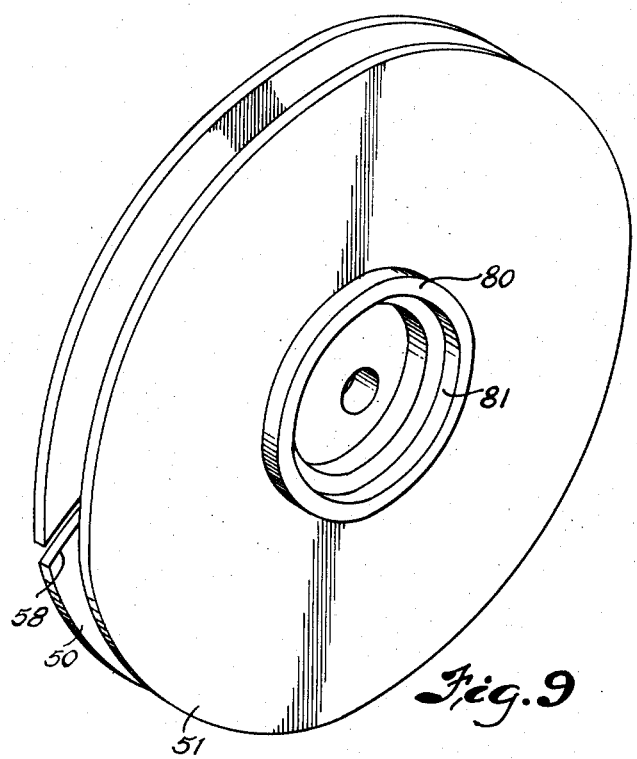

Fig. 9 is a perspective view of the cord reel spool with the cover casing removed and showing the recess and flange for the locking eccentric.

Figure 10:
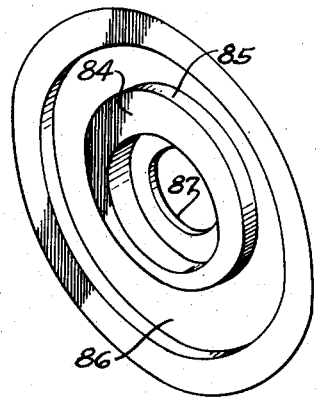

Fig. 10 is a perspective view of the combined locking cam member and manually operable releasing disk carrying the same.

Figure 11:
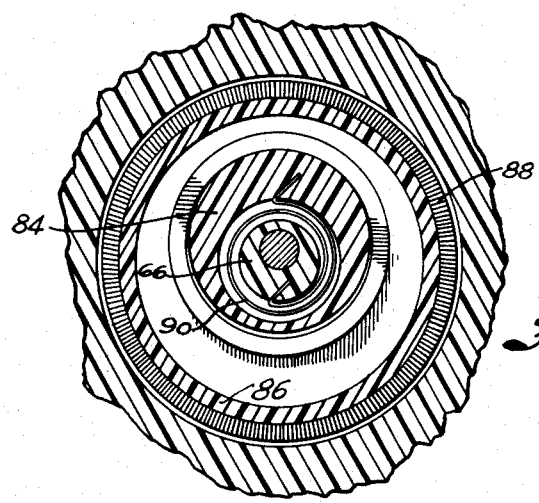

Fig. 11 is a radial sectional view through the locking cam of a portion of the releasing member and adjacent housing, the plane of the section being indicated by the line 11—11 of Fig. 7.

Fig. 12 is a fragmentary elevation of a modified form of connector support; and

Fig. 13 is a fragmentary detail section taken on the line 13—13 of Fig. 12.

Describing the two forms of my invention as shown in the drawings by the use of reference numerals, I refer first to the embodiment illustrated in Figs. 1 to 5. Here the cord take-up pulley or spool is shown as comprising a pair of separated offset disks, the transverse or offset portions 3 and 4 of which present spiral surfaces onto which may be wound the inner reaches of the two-wire, unitary, substantially flat cords C. The inner portions of the disk extend inwardly to a hub and lie flat against a central divider disk 5. These parts may be made of molded plastic of any suitable nature, and may be held together by cement or by rivets such as indicated at 6.

The divider or partition disk 5 is shown as provided with a slot 8 extending from the hub and spiral cord receiving shoulders 3 and 4 to the outer periphery, and at its inner portion it is radially enlarged, as at 9 (Fig. 5), to fit the contour of the two-wire unitary cord, which is looped at its middle portion and extends outwardly one reach thereof at either side of the central partition disk 5. This enlarged portion of the slot may also receive a cord retaining dowel 10, there being aligned openings in the disks 1 and 2. The spiral surfaces on the offset portions 3 and 4 merge at its small radial distance with the curved portion fitting the dowel, and the larger radial distance of these spiral surfaces conforms to the outer portion of the dowel pin, as appears in Fig. 3.

The cord C, as appears particularly in Fig. 2, is substantially flat and at its mid portion it is looped to be wound on both sides of the disk 5, having been passed around the enlargement at 9 of the slot 8 in the disk 5. The cord being of resilient material, it may be held in that position by the locking dowel 10, which may pass through either of the registering openings in the flange portions of the disks 1 and 2, as appears in the enlarged sectional view of Fig. 5. The two reaches of the cord may now pass around the spiral shoulders 3 and 4, over the pin 10, and lie flat upon the inner layers for the necessary number of turns.

As shown in Fig. 3, one end of the cord is provided with the outlet terminal plug 12, while the terminal 14 at the other end of the wire is adapted to engage the terminals of the electric motor. It is understood that the three parts comprising the two cord receiving compartments of the pulley or spool revolve as a unit on a hollow shaft member 15, which is shown as having a central radial flange seated against a hub portion of one member of the outer casing or frame 16, while at the other side of the flange, it is seated in the central opening in the composite pulley member. A screw 17 threaded into one end of this hollow shaft has its head seated against a spacer, or distance sleeve, 18, and serves to hold the hollow shaft member firmly locked to the casing member 16.

A disk or release button 30 is rotatably mounted on the sleeve 18 and is held in position by the head of the screw 17. The connections of the cam release means with the cam mechanism and functioning thereof will presently appear.

The other end of the hollow shaft member receives the threads of a slotted screw 20, the non-circular head 21 of which is normally non-rotatably seated in a corresponding recess in the central portion of the outer surface of the other casing member 25. The screw 20 is shown as having a transverse longitudinal slot which is adapted to receive the end of the spiral spring, like a clock spring, acting as the motor for winding the cord, as will also presently appear.

The casing members are shown as suitably rabbited at 26, at their outer, inturned meeting flange portions, the pair of casing members thus forming a flat housing, the outer perimeter of which is shown as cylindrical, although obviously the shape may be varied for artistic appeal.

The spring motor, as indicated above, is in the form of a flat spiral spring similar to a clock spring, indicated at 35, having one end bent to extend into and fit tightly in a slot in the hub supporting screw 20, while its other end is turned outwardly, as at 37, to fit a slot formed in the offset portion 4 of the disk 2. As indicated, the disks and hub portions rotate as a unit, and as the cord is drawn outwardly, for example, to the unwound extended condition illustrated in Fig. 3, the spring is further coiled and "wound" to exert a tension, tending to rewind the cord.

The importance of locking the disks in any such position with the cord pulled out is obvious, but the locking mechanism must be simple, certain in its holding action, and yet be easily released.

The inner surface 41 of the offset 3 may be cylindrical and concentric with the axis of the spool itself, and within this cylindrical recess I provide an eccentric locking cam 40 journalled on an eccentric portion 42 of the hub of the casing member 16. This eccentric member 42 in turn has a recess receiving a cam locking spring 45, one end of which is extended into and anchored to the eccentric portion 42, while the other end extends outwardly into the thickened portion of the cam, as shown at 44 in Fig. 4.

Referring further to Fig. 4, it will be seen that if the cam is moved relatively in the direction of the arrow 47, as indicated there by a dot and dash line, the thickened portion of the cam will be drawn away from the cylindrical inner surface 41 of the offset disk 1. A pin 34 is tightly fitted into the thickened portion of the cam member 40 and projects outwardly through an arcuate slot 33 in the flat wall of the casing member 16, and into a cavity 32 in the cam release button 30. Thus, when the spring 35 tends to revolve the cord spool in a direction to wind the cords, this motion is resisted by the wedge-like locking action of the cam member 40, normally urged toward the locking and gripping position by its spring 45. The relative curvatures are such that only slight friction is needed to cause sufficient motion of the cam to very effectively frictionally wedge and grip its coacting surface 41 on the disk spool. Correspondingly, by turning the release button or disk 30 in the opposite direction, the cam is freed from its locking position and the motor spring 35 then turns the cord reel to rewind the cord.

From the foregoing description of the embodiment illustrated in Figs. 1 to 5, it will be seen that the advantages and objects are attained in a simple, compact device capable of being easily assembled and economically manufactured, which is simple to use and its locking mechanism is positive and secure when the cords are extended for use.

It is to be understood that the shape may be changed for styling and aesthetic effects in which coloring may be an important factor by reason of the design and construction making possible the use of modern plastic molding and forming methods.

The standard electric two-wire razor cords may be used with the take-up reel described. The assembly is relatively simple, it being only necessary to place the cord in winding position to first fold it at the middle; insert it in the slot 8 and notch 9 of the divider disk 5; wind it flat upon the spools; and then assemble the parts as shown, tightening the screw 17 after so winding the cords in layers in the two-part spool with the spring motor under tension.

In use, the reel is suspended intermediately of the length of the cord, but inasmuch as its design permits it to be embodied in the complete structure of only a few ounces, the reel has been found to be very convenient to use.

The modified embodiment illustrated in Figs. 6 to 11 utilizes similar mechanism for effecting the winding and cam locking action when the cord is extended. By a novel re-arrangement, illustrated in these figures, I may wind the same length of cord onto a single spool of slightly increased diameter relative to the two-part spool embodiment, and may so mount it that the reel will be positioned near the wall plug end of the cord when in use. For example, some users of electric razors prefer to have the reel suspended and positioned a few inches from the wall plug outlet, while the greater length of the cord extends from the spool to the razor in the hand of the user.

My preferred form of such an embodiment will now be described in reference to Figs. 6 to 12.

As shown particularly in Figs. 7 and 9, the spool comprises two disk-like flanges 50 and 51 integral with the cord receiving portion of a hub 52 provided with a bearing 53, and shaped to form spring receiving cavities and a locking cam flange, as will presently appear. The central portion of the hub is shaped to provide a bearing 53 which rotates upon a journal member 55 having its journal portion in the form of a cylindrical sleeve internally threaded onto a supporting stud, as will presently appear.

The cord may fit into and turn and extend part way around an arcuate groove 56, where it passes through the inner end of a curved slot 58 formed in the side disk 50 of the spool. The depth of the groove 56 and its arcuate extent permits the cord to curve, as at $C^1$, a substantial distance around the hub portion of the spool, where it is brought gradually into radial alignment with the surface between the disks onto which the cord is to be wound.

From within the spool and between the side flanges 50 and 51 thereof, the cord is shown as extending outwardly, as at $C^3$, through a notch or opening 59 in the flange 60 integral with a frame plate and housing member, which is shown as comprising a disk-like portion 62 having a central opening 63 and a spool supporting bridge 65, leaving segmental openings at either side thereof for releasing the locking cam, as will presently appear.

The bridge portion 65 is formed with a boss 66 into which is tightly fitted, and thus rigidly carried, the fluted head 70 of a central supporting axle member, having screw threads at its inner end onto which the journal 55 is tightly screwed and which there forms the bearing for the spool hub member 53, as indicated above. Thus, the spool is carried on the member 70 through the bearing sleeve portion threaded onto it, and is rigidly, centrally located.

The enlarged head of the journal member serves to hold the spool and frame plate in assembled position, while permitting the spool to freely rotate on its support and within the flange 60.

On the inner side of the spool is a recess concentric with the axis for receiving a flat spiral winding spring corresponding to the spring 35 of Figs. 1 to 3. As previously described, one end of the spring 75 has an outwardly turned projection 76 engaging a recess formed in the hub of the spool, while its other end is turned and fits into a slot formed along the axis end of the axle stud 70. The spring, when assembled, is tensioned to wind the cord onto the spool.

The cam locking means for preventing the reel from rewinding the cord when in use functions in a manner similar to the cam lock described in connection with the form shown particularly in Figs. 1, 2, and 4. Here, however, a flange 80 extending inwardly from the hub member 52 presents a cylindrical surface 81 concentric with the axis of rotation of the spool.

The coacting cam member 84 presents an eccentric surface 85 in gripping relation to the surface 81 being formed on an annular boss, preferably shaped approximately as appears in Figs. 10 and 11. The cam is integral with the disk 86, having a serrated, beveled edge, as indicated at 88, and mounted to have its central opening 87 rotate upon the eccentric surface of the boss 66 integral with the bridge 65.

Within the cam member 84 is formed a recess to receive a spiral cam locking spring 90, having one end engaging the boss 66 and the other, the cam member 84, and tending to rotate the cam in a position to move it outwardly into tight engagement with the cam surface 81. The movement of the cam is in a direction, namely, clockwise in Fig. 11, to effect a gripping and locking action between the frame and spool, preventing the spool from winding the cord. Thus, when the cam carrying disk is rotated, as by applying the finger to the serrated edge 88, the cam may be released, permitting the rewinding spring 75 to turn the spool and reel in the cord.

To assemble the cord into the spool, it is only necessary to bring the slot 58 into registration with the notch 59 in the flange 60, and pass the cord near one end thereof, namely, near the wall plug 12, into this curved slot, which then may be pressed edgewise into the arcuate groove 56 for a part of a turn, bringing one portion of the cord within the disk flange 50 and at a corresponding opening between the groove 56 and the substantially cylindrical hub surface onto which the cord is to be wound.

Thereafter, because of the curvature of the slot 58, there is no tendency for the cord to engage it as it rotates while being wound or unwound.

As illustrated in Figs. 12 and 13, the wall plug terminal 12 of the cord may have its prongs engage two sides of a boss formed on the disk 50, with the body of the plug portion extending inwardly and lying flat against the disk, thus affording a minimum of obstruction and maintaining the assembled wound cord and its terminals within a thin, flat space. This plug securing member may be in the form of a boss 95 having side flanges 96 adapted to overhang the prongs of the plug 12, as shown.

In Fig. 6, it will be noted that the terminal 12 is illustrated as attached to a wall socket, shown in broken lines at S, thus roughly approximating the cord position when nearly or fully unwound, and whereby the reel may be close to the wall terminal and be supported thereby with a minimum of swinging action while using the razor.

With respect to the form of the embodiment of my invention shown as assembled in Figs. 6, 7, and 8, it will be seen that I have not only provided for suspending the reel close to the current outlet to which it is to be attached while a major portion of the cord leads to the razor, but I have still maintained a relatively small-diameter reel which is thinner than the reel previously described, which winds the cord on adjacent spools.

In practice, the cord of the standard length usually used may be wound on a reel such as shown and described which does not exceed four inches in diameter, and may be as thin as three-quarters inch or less.

The device is sure and effective in its locking; the lock may be readily released to permit the rewinding; and it is convenient to use, simple to manufacture, and rugged for resisting blows or impacts to which it may be subject by dropping or tight packing, etc.

In respect to both forms of my invention, the cords may be readily inserted in the first instance and may be readily replaced whenever necessary. The cords are not subject to injury by reason of the reeling with either form of my device as shown. The convenience, as compared to the annoying work of folding or winding a cord by hand or packing in a razor case or in a separate holder, is obvious. It requires no special materials or exceptional skill or equipment for its manufacture.

Having thus described my invention, what I claim is:

1. A reel for winding and storing a two-wire flat type electric razor cord comprising a casing having parallel walls and perimeter forming portions, a spool enclosed therein, screw threaded spool-supporting stud means at the axis extending through the two parts of the casing, a journal member carried thereon, the spool having a hub bearing on said journal member and having widened portions and outwardly extending disks at each end of the hub, an intermediate flange midway between the end disks, the disks being spaced to receive the width of the cord, the intermediate flange having a slot leading from its periphery inwardly to the hub, the hub having a spiral surface providing an offset substantially the width of the cord and registering with said slot, the slot being arranged to receive the cord edgewise and permit it to be turned to present parallel reaches which may be wound in parallel coils on the hub, means for turning the spool to wind the cord, and means for latching the spool with the cords extended.

2. The device defined in claim 1 in which the winding means comprises a spiral spring having one end connected with said spool supporting stud, and having its other end engaging the spool at one side of the hub, a recess in the opposite side of the hub of the spool, an eccentric bearing formed on the casing wall, a cam member rotatable on said eccentric bearing, the hub having a concentric cylindrical surface positioned to be engaged by the cam, a spring for moving the cam on the eccentric bearing to latch the spool against winding motion, and means on the outside of the casing connected with the cam for releasing the cam to permit the winding spring to turn the spool.

3. A reel for winding a flat two-wire electric cord comprising a spool having a drum and disk-like flanges at the ends of the drum and an intermediate separator disk, said disk having a slot extending from its periphery inwardly to the hub of the spool through which the mid-portion of the cord may be passed edgewise and be folded at the slot to permit the two portions of the cord to be wound in parallel coils between the separator disk and end flanges, means for rotating the spool, means for latching the spool with the two reaches of the cords in unwound extended position, the hub portion being shaped to present spiral surfaces terminating adjacent the inner end of the slot, one portion terminating radially inwardly from the other end of the spiral surface of the hub a distance equal to the width of the cord and presenting an offset shoulder whereby the cord may be bent flatwise with relation to the separator disk at said shoulder and may be turned to wind with its wide dimension parallel with the axis lying flat on the spool as additional coils of the cord are wound thereon.

4. A reel for winding a flat two-wire electric cord comprising a spool having a drum and disk-like flanges at the ends of the drum and an intermediate separator disk, said disk having a slot extending from its periphery inwardly to the hub of the spool through which the mid-portion of the cord may be passed edgewise and be folded at the slot to permit the two portions of the cord to be wound in parallel coils between the separator disk and end flanges, means for rotating the spool, means for latching the spool with the two reaches of the cords in unwound extended position, the hub portion being shaped to present spiral surfaces terminating at an offset adjacent the inner end of the slot equal to the width of the cord, whereby the cord may be bent flatwise with relation to the separator disk and may be turned to wind with its wide dimension parallel with the axis lying flat on the spool as additional coils of the cord are wound thereon, and clamping means engaging the cord at said offset for holding the two reaches of the cord against relative longitudinal movement.

5. An electric cord reel comprising a spool having a hub portion and side flanges, means on the spool for engaging the cord intermediate its ends, permitting both ends to extend outwardly therefrom, a casing for surrounding the spool and having means for rotatably supporting the same, the spool having a hub portion provided with a recess for receiving a flat coiled spring, one end of which is attached to the casing and the other end engaging the spool and tensioned to turn the spool to wind the cord, the spool also having a recess provided with a surface concentric with the axis of the spool, the casing having an eccentric bearing, a latching cam rotatable on said bearing and having a friction surface eccentric to the bearing and adapted to wedgingly engage said concentric surface, a spring connecting the casing and cam tensioned to move the cam surface outwardly to engage said cylindrical surface with a wedging action to resist rewinding, means for turning the cam to disengage it from said cylindrical surface permitting the spool to rewind the cord, said casing having an opening therethrough, a pin connected to said cam and projecting through said opening and free to move circumferentially therein, and means outside the casing and rotatable thereon for moving the pin and cam.

6. An electric cord reel comprising a spool having a hub portion and side flanges, means on the spool for engaging the cord intermediate its ends, permitting both ends to extend outwardly therefrom, a casing for surrounding the spool and having means for rotatably supporting the same, the spool having a hub portion provided with a recess for receiving a flat coiled spring, one end of which is attached to the casing and the other end engaging the spool and tensioned to turn the spool to wind the cord, the spool also having a recess provided with a surface concentric with the axis of the spool, the casing having an eccentric bearing, a latching cam rotatable on said bearing and having a friction surface eccentric to the bearing and adapted to wedgingly engage said concentric surface, a spring connecting the casing and cam tensioned to move the cam surface outwardly to engage said cylindrical surface with a wedging action to resist rewinding, means for turning the cam to disengage it from said cylindrical surface permitting the spool to rewind the cord, said eccentric bearing for the cam being carried on one wall of the casing, opposite that of the winding spring and within the spool hub at its end opposite to the winding spring, the casing having an opening, a rotatable disk concentric with the axis having finger engageable means and connected with said cam through said opening to release the same to permit rewinding of the cord.

References Cited in the file of this patent

UNITED STATES PATENTS

| | | |
|---|---|---|
| 875,280 | McGavin | Dec. 31, 1907 |
| 1,084,960 | Randall | Jan. 20, 1914 |
| 2,031,434 | Stern et al. | Feb. 18, 1936 |
| 2,211,561 | Flannelly | Aug. 13, 1940 |
| 2,647,341 | Donnell | Aug. 4, 1953 |

FOREIGN PATENTS

| | | |
|---|---|---|
| 683,181 | Great Britain | Nov. 26, 1952 |